(12) United States Patent
Pachta et al.

(10) Patent No.: US 12,510,745 B2
(45) Date of Patent: Dec. 30, 2025

(54) TOOLLESS KNOB ASSEMBLY FOR OPTICAL DEVICE

(71) Applicant: LEUPOLD & STEVENS, INC., Beaverton, OR (US)

(72) Inventors: Gustin Pachta, Beaverton, OR (US); Mitchell Gross, Beaverton, OR (US)

(73) Assignee: LEUPOLD & STEVENS, INC., Beaverton, OR (US)

( * ) Notice: Subject to any disclaimer, the term of this patent is extended or adjusted under 35 U.S.C. 154(b) by 0 days.

(21) Appl. No.: 18/590,787

(22) Filed: Feb. 28, 2024

(65) Prior Publication Data
US 2024/0302642 A1 Sep. 12, 2024

Related U.S. Application Data

(60) Provisional application No. 63/488,723, filed on Mar. 6, 2023.

(51) Int. Cl.
*G02B 23/16* (2006.01)
*F41G 1/38* (2006.01)

(52) U.S. Cl.
CPC .............. *G02B 23/16* (2013.01); *F41G 1/38* (2013.01)

(58) Field of Classification Search
CPC ................................. G02B 23/16; F41G 1/38
USPC .................................................... 42/119, 122
See application file for complete search history.

(56) References Cited

U.S. PATENT DOCUMENTS

| | | | |
|---|---|---|---|
| 3,095,750 A | 7/1963 | Mahn | |
| 3,280,463 A | 10/1966 | Stadler | |
| 3,990,155 A | 11/1976 | Akin, Jr. et al. | |
| 4,012,966 A | 3/1977 | Lieberman et al. | |
| 4,038,757 A | 8/1977 | Hicks et al. | |
| 4,200,355 A | 4/1980 | Williams, Jr. | |
| 4,247,161 A | 1/1981 | Unertl, Jr. | |
| 4,285,137 A | 8/1981 | Jennie | |
| 4,373,269 A | 2/1983 | Doliber et al. | |
| 4,643,542 A | 2/1987 | Gibson | |
| 4,789,231 A | 12/1988 | Shimizu | |
| 5,499,456 A | 3/1996 | Tomita | |
| 5,513,440 A | 5/1996 | Murg | |

(Continued)

FOREIGN PATENT DOCUMENTS

| | | |
|---|---|---|
| WO | 2020064762 A1 | 4/2020 |
| WO | 2022010625 A2 | 1/2022 |

OTHER PUBLICATIONS

European Patent Office, International Search Report and Written Opinion of the International Searching Authority in PCT/US2024/017749, mailed Jun. 5, 2024, 11 pages.

*Primary Examiner* — Samir Abdosh
(74) *Attorney, Agent, or Firm* — Schwabe, Williamson & Wyatt, P.C.

(57) ABSTRACT

Various embodiments described herein may include a rotatable assembly including a rotatable knob, the rotatable assembly further including: a collet or other body having capturing member(s) to at least partially surround or flank a spindle; and a grippable device usable to move the collet relative to the spindle to disengage the capturing member(s) from the spindle; wherein the knob and the spindle rotate together as a unit when the capturing member(s) are engaged to the spindle, and wherein the knob rotates relative to the spindle when the capturing member(s) are disengaged from the spindle. Other embodiments may be disclosed and/or claimed.

20 Claims, 13 Drawing Sheets

(56) References Cited

U.S. PATENT DOCUMENTS

| | | |
|---|---|---|
| 5,615,487 A | 4/1997 | Tomita |
| 6,279,259 B1 * | 8/2001 | Otteman ............... F41G 1/38 42/122 |
| 6,351,907 B1 | 3/2002 | Otteman |
| 6,519,890 B1 | 2/2003 | Otteman |
| 6,643,970 B2 | 11/2003 | Huber |
| 6,691,447 B1 | 2/2004 | Otteman |
| 7,415,791 B2 | 8/2008 | Williams, III et al. |
| 7,578,091 B2 | 8/2009 | Klepp et al. |
| 7,581,346 B2 | 9/2009 | Klepp et al. |
| 7,612,952 B2 | 11/2009 | Schäfer |
| 7,626,760 B2 | 12/2009 | Wu |
| 7,640,830 B2 | 1/2010 | Bonis |
| 7,827,723 B1 | 11/2010 | Zaderey et al. |
| 7,913,440 B2 | 3/2011 | Murg et al. |
| 7,934,335 B2 | 5/2011 | Halverson |
| 7,958,665 B2 | 6/2011 | Hamilton |
| 7,997,163 B2 | 8/2011 | Casas |
| 8,006,429 B2 | 8/2011 | Windauer |
| 8,104,217 B2 | 1/2012 | Huber |
| 8,166,696 B2 | 5/2012 | Hamilton |
| 8,270,104 B2 | 9/2012 | Windauer |
| 8,312,667 B2 | 11/2012 | Thomas et al. |
| 8,397,420 B2 | 3/2013 | Hamilton |
| 8,413,364 B2 | 4/2013 | Riley |
| 8,448,374 B2 | 5/2013 | Samson et al. |
| 8,479,402 B2 | 7/2013 | Schmitt |
| 8,490,317 B2 | 7/2013 | Adkins et al. |
| 8,516,736 B2 | 8/2013 | Windauer |
| 8,670,179 B2 | 3/2014 | Windauer |
| 8,806,798 B2 | 8/2014 | Crispin |
| 8,848,287 B2 | 9/2014 | Schmitt et al. |
| 8,875,435 B2 | 11/2014 | Menges et al. |
| 8,904,696 B2 | 12/2014 | Geller |
| 8,919,026 B2 | 12/2014 | Hamilton |
| 8,928,878 B2 | 1/2015 | Jaeschke et al. |
| 8,984,796 B2 | 3/2015 | Thomas et al. |
| 9,046,913 B2 | 6/2015 | Crispin |
| 9,057,586 B2 | 6/2015 | Wagner et al. |
| 9,062,934 B1 | 6/2015 | Presley et al. |
| 9,170,068 B2 | 10/2015 | Crispin |
| 9,182,773 B2 | 11/2015 | Campean |
| 9,188,408 B2 | 11/2015 | Huynh |
| 9,292,034 B2 | 3/2016 | Windauer |
| RE46,011 E | 5/2016 | Huber |
| 9,354,438 B2 | 5/2016 | Ingenito et al. |
| 9,423,215 B2 | 8/2016 | White et al. |
| 9,435,609 B2 | 9/2016 | Hamilton |
| 9,488,825 B2 | 11/2016 | Sigmund |
| 9,665,120 B2 | 5/2017 | Windauer |
| 9,677,848 B2 | 6/2017 | Hamilton |
| 9,753,483 B1 | 9/2017 | Thomas et al. |
| 9,835,819 B2 | 12/2017 | Tang |
| 9,958,235 B2 | 5/2018 | Lassak et al. |
| 9,958,666 B2 | 5/2018 | Ingenito |
| 9,970,735 B2 | 5/2018 | Walker |
| 9,989,362 B2 | 6/2018 | Öttl et al. |
| 10,012,476 B2 | 7/2018 | Öttl |
| 10,054,398 B2 | 8/2018 | White et al. |
| 10,101,122 B2 | 10/2018 | Davidson et al. |
| 10,132,593 B2 | 11/2018 | White et al. |
| 10,145,651 B2 | 12/2018 | Cheng |
| 10,180,698 B2 | 1/2019 | Tsai et al. |
| 10,190,848 B2 | 1/2019 | VanBecelaere |
| 10,190,849 B1 | 1/2019 | Webber |
| 10,197,360 B2 | 2/2019 | White et al. |
| 10,234,239 B1 | 3/2019 | Webber |
| 10,241,318 B2 | 3/2019 | Takahashi et al. |
| 10,302,394 B2 | 5/2019 | Ding et al. |
| 10,309,749 B2 | 6/2019 | Hamilton |
| 10,330,438 B2 | 6/2019 | Schmidt |
| 10,345,079 B2 | 7/2019 | Geller |
| 10,365,100 B2 | 7/2019 | Öttl et al. |
| 10,443,979 B2 | 10/2019 | Sheets, Jr. et al. |
| 10,466,735 B2 | 11/2019 | Tsai et al. |
| 10,495,415 B2 | 12/2019 | Chou et al. |
| 10,578,399 B2 | 3/2020 | Crispin |
| 10,591,253 B1 | 3/2020 | Webber |
| 10,655,935 B1 | 5/2020 | White et al. |
| 10,690,445 B2 | 6/2020 | Hamilton |
| 10,724,828 B2 | 7/2020 | Hamilton |
| 10,724,829 B1 | 7/2020 | Ding et al. |
| 10,830,561 B2 | 11/2020 | Davidson et al. |
| 10,866,064 B2 | 12/2020 | Weiszl |
| 10,900,747 B2 | 1/2021 | Kilic |
| 10,907,933 B1 | 2/2021 | Hamm et al. |
| 10,921,576 B2 | 2/2021 | Weiszl |
| 10,962,328 B2 | 3/2021 | Hamilton |
| 11,105,587 B2 | 8/2021 | Hamilton et al. |
| 11,156,435 B2 | 10/2021 | Hamilton |
| 11,243,049 B1 | 2/2022 | Enzinger |
| 11,248,876 B2 | 2/2022 | Davis et al. |
| 11,255,636 B2 | 2/2022 | Crispin |
| 11,320,241 B2 | 5/2022 | Hamilton et al. |
| 11,353,289 B2 | 6/2022 | Walker et al. |
| 11,372,228 B1 * | 6/2022 | Davis ............... G02B 23/00 |
| 11,372,229 B2 | 6/2022 | Xiong et al. |
| 11,530,899 B2 | 12/2022 | Sheets, Jr. |
| 11,906,268 B2 | 2/2024 | Enzinger |
| 2007/0240356 A1 | 10/2007 | Klepp et al. |
| 2008/0066364 A1 | 3/2008 | Klepp et al. |
| 2010/0175298 A1 | 7/2010 | Thomas et al. |
| 2011/0061285 A1 * | 3/2011 | Hamilton ............... F41G 1/38 42/122 |
| 2011/0100152 A1 | 5/2011 | Huynh |
| 2011/0261449 A1 | 10/2011 | Schmitt |
| 2014/0137458 A1 | 5/2014 | Crispin |
| 2014/0196351 A1 | 7/2014 | Campean |
| 2014/0237884 A1 | 8/2014 | Koesler et al. |
| 2014/0352487 A1 | 12/2014 | Crispin |
| 2016/0040959 A1 | 2/2016 | Davidson et al. |
| 2016/0169672 A1 * | 6/2016 | Öttl ............... G01C 15/004 356/247 |
| 2016/0370146 A1 * | 12/2016 | Hamilton ............... G02B 23/14 |
| 2017/0191797 A1 * | 7/2017 | Lassak ............... F41G 1/44 |
| 2017/0226806 A1 | 8/2017 | Nguyen |
| 2018/0292171 A1 * | 10/2018 | Hamilton ............... G02B 23/14 |
| 2019/0128642 A1 | 5/2019 | Davis et al. |
| 2019/0310052 A1 * | 10/2019 | Krausz ............... F41G 1/38 |
| 2019/0376765 A1 * | 12/2019 | Hamilton ............... F41G 1/38 |
| 2020/0278179 A1 | 9/2020 | Ding et al. |
| 2020/0326155 A1 | 10/2020 | Hamilton et al. |
| 2021/0302127 A1 | 9/2021 | Mueller |
| 2021/0325147 A1 | 10/2021 | Gruner et al. |
| 2021/0389553 A1 | 12/2021 | Campbell et al. |
| 2021/0396492 A1 | 12/2021 | Hamilton et al. |
| 2022/0042768 A1 | 2/2022 | Hamilton |
| 2022/0136803 A1 | 5/2022 | Davis et al. |
| 2022/0170717 A1 | 6/2022 | Crispin |
| 2022/0229281 A1 | 7/2022 | Sakai et al. |
| 2022/0244521 A1 | 8/2022 | Liang |
| 2022/0373296 A1 | 11/2022 | Cheng |
| 2022/0390736 A1 | 12/2022 | Chang |
| 2022/0413278 A1 | 12/2022 | Cheng |
| 2023/0134361 A1 | 5/2023 | Enzinger |

* cited by examiner

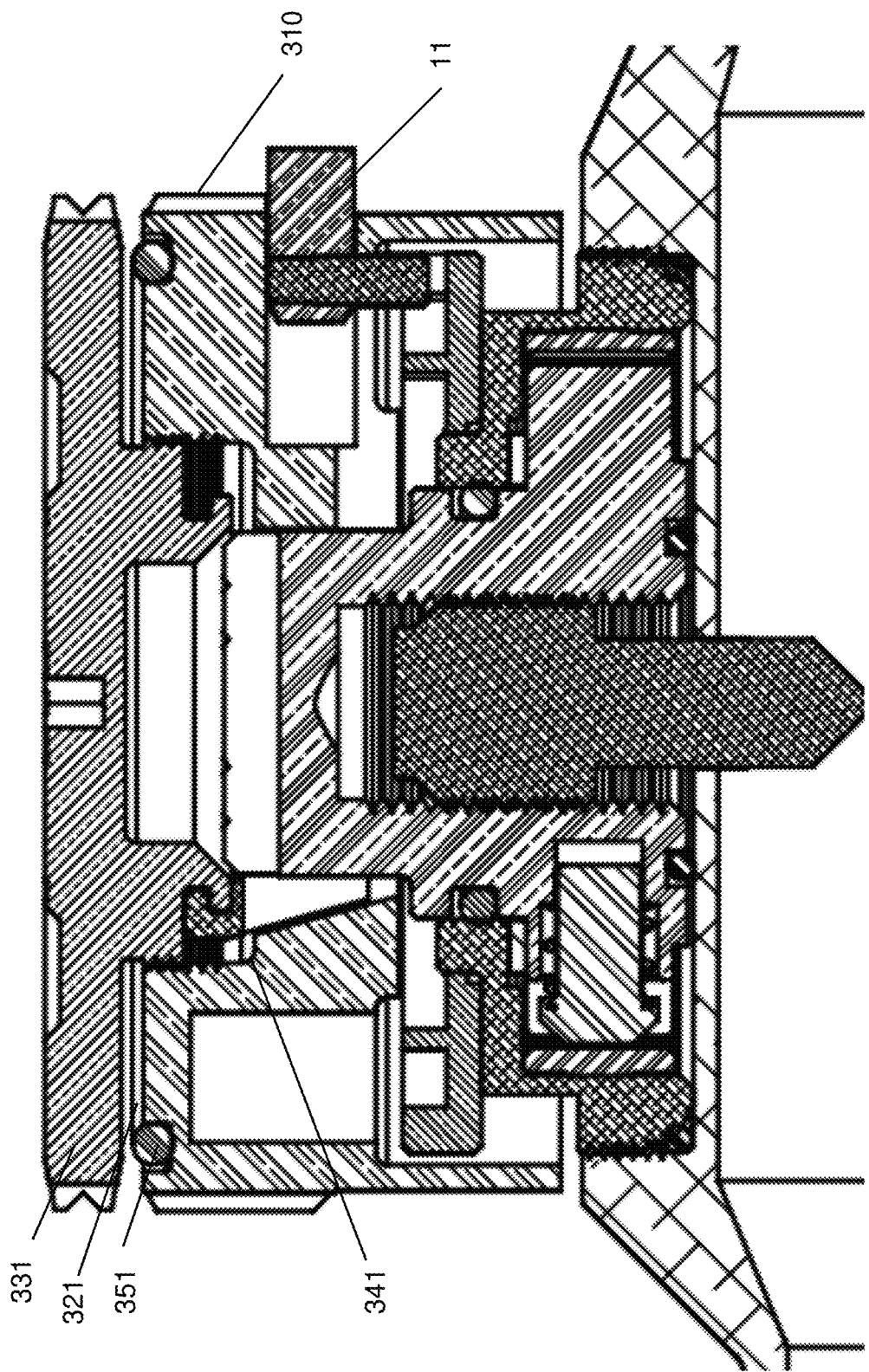

TOOLLESS KNOB ASSEMBLY FOR OPTICAL DEVICE

RELATED APPLICATIONS

This application claims priority benefit to U.S. provisional application Ser. No. 63/488,723, filed on Mar. 6, 2023, which is incorporated by reference herein in its entirety.

The subject matter described in this application is related to U.S. patent application Ser. No. 17/651,789, filed Feb. 22, 2022, which is a continuation of U.S. patent application Ser. No. 16/807,051, filed Mar. 2, 2020 (now U.S. Pat. No. 11,255,636) and entitled "LOCKING ADJUSTMENT DEVICE, which is a continuation of U.S. patent application Ser. No. 14/923,158, filed Oct. 26, 2015 (now U.S. Pat. No. 10,578,399) and entitled "LOCKING ADJUSTMENT DEVICE," which is a continuation of U.S. patent application Ser. No. 13/343,656 filed Jan. 4, 2012 (now U.S. Pat. No. 9,170,068) and entitled "LOCKING ADJUSTMENT DEVICE," the disclosures of which are incorporated by reference herein in their entireties.

TECHNICAL FIELD

The field of the present disclosure relates generally to rotating adjustment mechanisms, and in particular, to a toolless knob assembly for actuating an optical or electrical element of an optical device (e.g., a sighting device, such as a riflescope, a telescope, or other aimed optical device).

BACKGROUND

Sighting devices such as riflescopes have long been used in conjunction with weapons and firearms, such as rifles, handguns, and crossbows, to allow a shooter to accurately aim at a selected target. Because bullet and arrow trajectory, wind conditions, and distance to the target can vary depending upon shooting conditions, quality sighting devices typically provide compensation for variations in these conditions by allowing a shooter to make incremental adjustments to the optical characteristics or the aiming of the sighting device relative to the weapon surface on which it is mounted. These adjustments are known as elevation and windage adjustments, and are typically accomplished by lateral movement of an adjusting member, such as a reticle located within the riflescope, as shown in U.S. Pat. No. 3,058,391 of Leupold, or movement of one or more lenses within a housing of the riflescope, as shown in U.S. Pat. Nos. 3,297,389 and 4,408,842 of Gibson, and U.S. Pat. No. 7,827,723 of Zaderey et al.

The shooter typically makes such adjustments using rotatable adjustment knobs to actuate the adjustable member of the sighting device. Rotatable knobs may also be used to adjust other features of riflescopes, binoculars, spotting scopes, or other suitable optical devices, such as parallax, focus, illumination brightness, or other suitable features. Although the rotatable knobs are described in relation to use with sighting devices, rotatable knobs may be used to adjust an adjustable portion of other devices, and may include volume control knobs, channel selection knobs, radio station selection knobs, and other suitable knobs.

The '636 patent describes the use of a set screw 186 (FIG. 2 of the '636 patent) that can be tightened using a tool, such as a hex-key, so that knob 174 (FIG. 2 of the '636 patent) and spindle 116 (FIG. 2 of the '636 patent) rotate together as a unit about axis 124, or loosened using the tool so that knob 174 can be rotated (about the axis 124) relative to spindle 116.

BRIEF DRAWINGS DESCRIPTION

The accompanying drawings, wherein like reference numerals represent like elements, are incorporated in and constitute a part of this specification and, together with the description, explain the advantages and principles of the presently disclosed technology.

FIG. 3B illustrates a sectional view of part of an optical device including the toolless knob assembly of FIG. 3A.

DETAILED DESCRIPTION

With reference to the drawings, this section describes particular embodiments and their detailed construction and operation. Throughout the specification, reference to "one embodiment," "an embodiment," or "some embodiments" means that a particular described feature, structure, or characteristic may be included in at least one embodiment. Thus appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

One advantage of the arrangement described with reference to FIG. 2 of the '636 patent is that, although the set screw 186 may be removable from its threaded bore 184, there is no requirement to remove it during normal operation (e.g., the set screw 186 is retained/captured by the threaded bore 184 during normal operation). Accordingly, there is little risk for an operator to lose the set screw 186 in the field—so long as the operator has the tool in the field, the operator may make adjustments in the field.

Unlike the arrangement described by the '636 patent, in which there is no requirement to remove parts to disengage the knob 174 from the spindle 116, some known toolless knob assemblies for sighting devices may require an operator to separate at least one part from a riflescope assembly, in order to disengage a rotatable knob from a spindle assembly. This requirement for removal/disassembly introduces a risk of the operator losing that separable part, and being unable to make adjustments in the field. This requirement for removal/disassembly also creates a risk that the operator may have difficulty re-attaching the part to the riflescope due to, say poor lighting conditions or bad weather in the field. What is needed is a toolless arrangement for toollessly disengaging a rotatable knob from a spindle assembly, without a requirement for separating any parts from the rest of the sighting device (e.g., without requiring separation of any parts from a turret assembly of the sighting device).

Figure 1A:
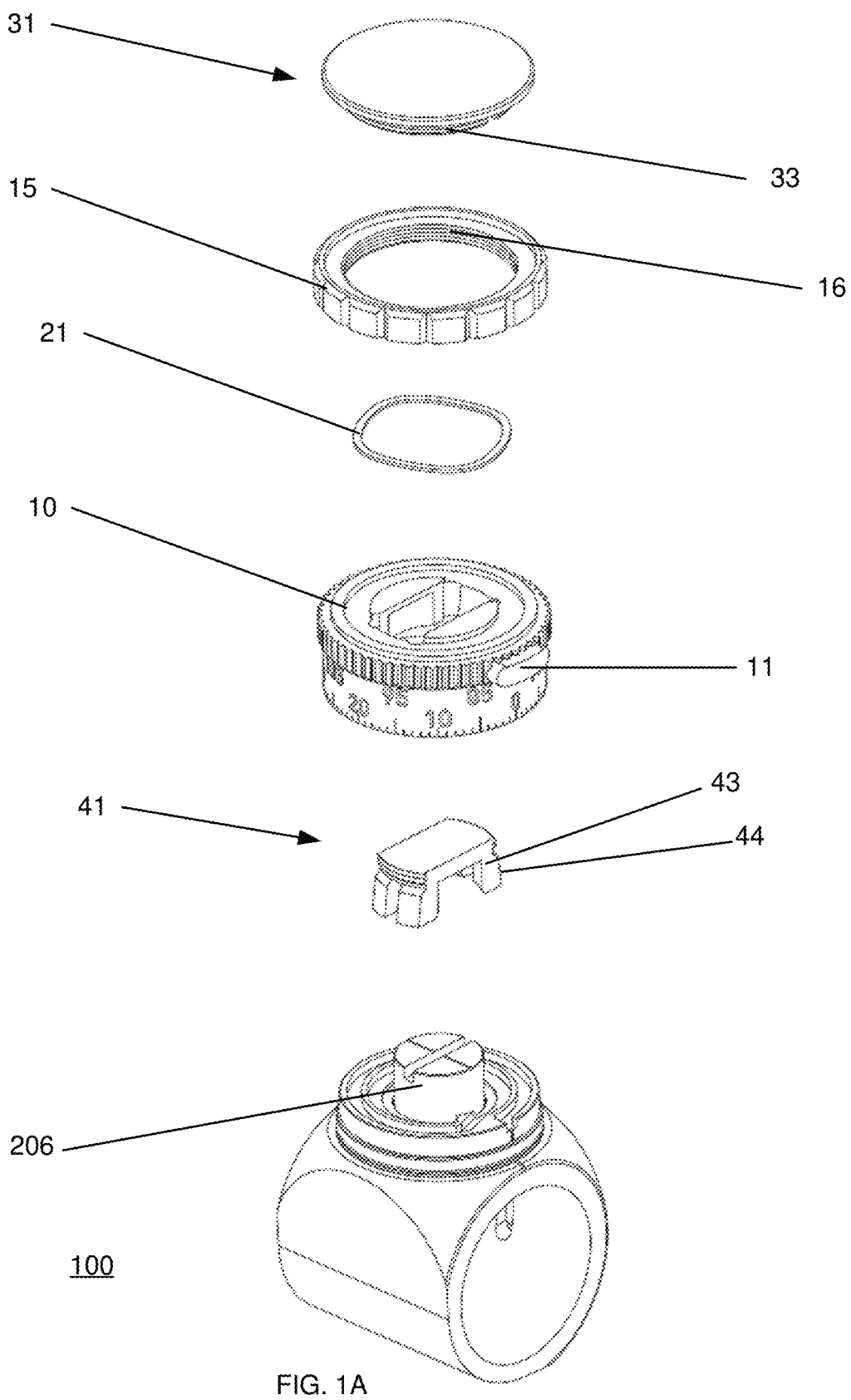
FIG. 1A illustrates an exploded isometric view of a toolless knob assembly, according to various embodiments.
Figure 1B:
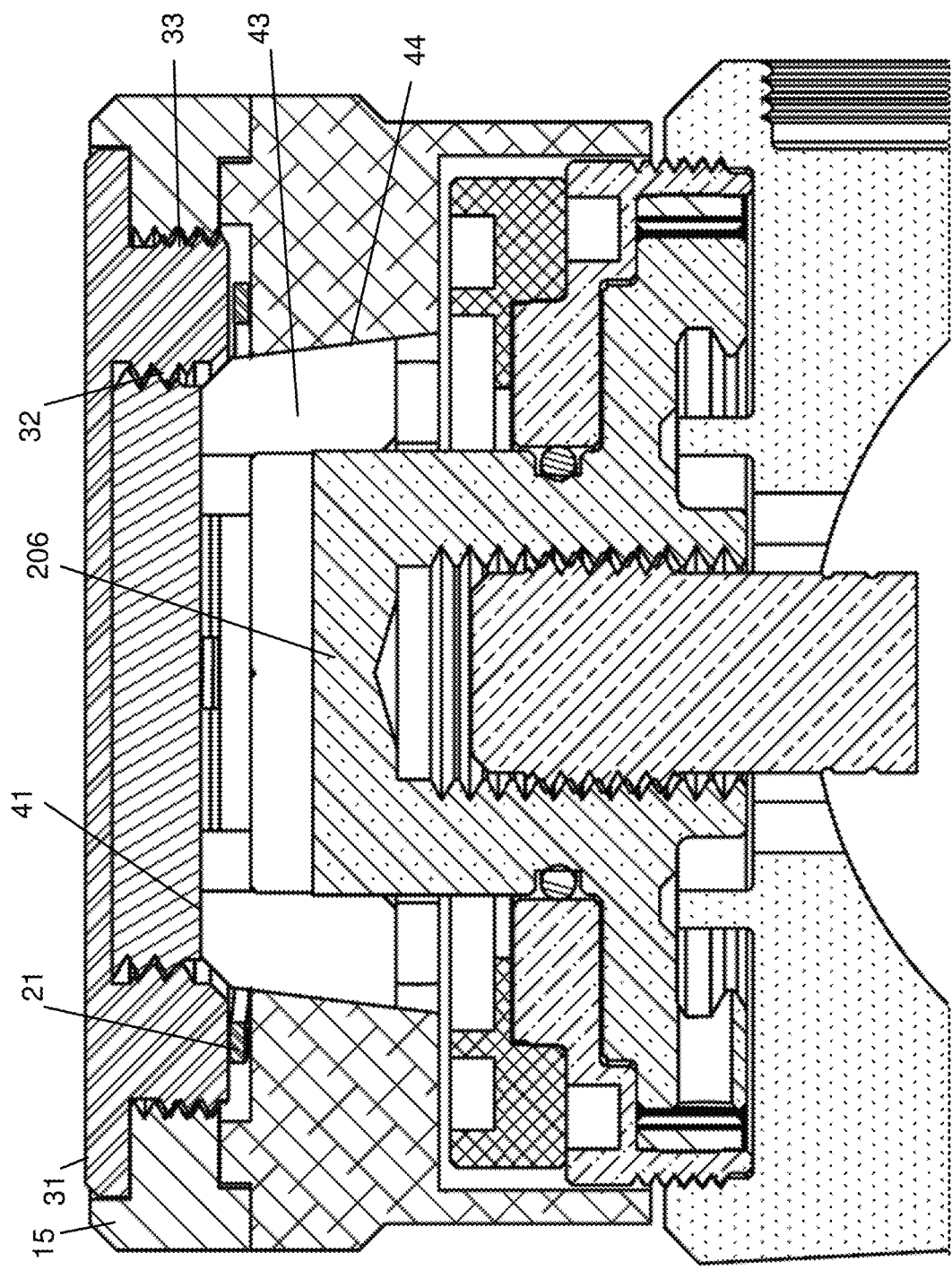
FIG. 1B illustrates a sectional view of part of an optical device including the toolless knob assembly of FIG. 1A.

FIG. 1A illustrates an exploded isometric view of a toolless knob assembly 100, according to various embodiments. FIG. 1B illustrates a sectional view of the toolless knob assembly 100 of FIG. 1A.

Figure 2A:
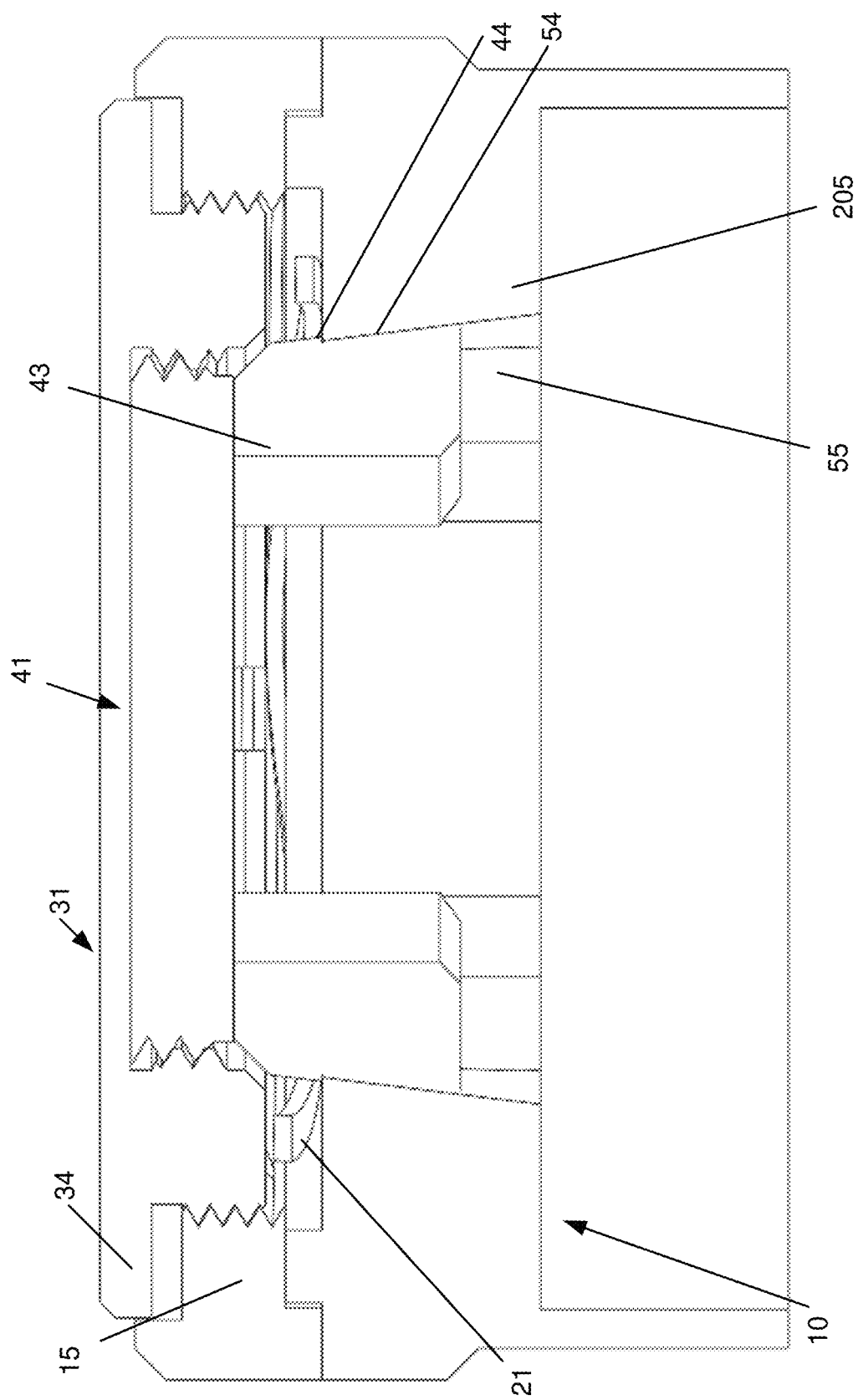
FIG. 2A illustrates a sectional view of part of an optical device including the toolless knob assembly of FIG. 1A in a first state.

The toolless knob assembly 100 includes a knob 10 and a capturing device 41, such as the illustrated collet or other part having a body and capturing members. A spring 21, such as a wave spring, urges a body of the collet 41 away from a spindle 206 of a spindle assembly. As illustrated in FIG. 2A, in this state the capturing members 43 of the collet 41 have ridden up the tapered cavity 54 they are located in, wedging the spindle 206 (FIG. 1B) between them (which engages the collet 41 to the spindle 206). In this state, the knob 10 and the spindle 206 (FIG. 1B) rotate together as a unit.

An operator may collapse (e.g., partially or fully collapse) the spring 21, by pushing down on the retaining cap 31, to move the body of the collet 41 towards the spindle 206 (FIG. 1B). This moves the capturing members 43 into a wider part of the tapered cavities, disengaging the collet 41 from the spindle 206. In this state, with the retaining cap 31 held down, the knob 10 may be rotated relative to the spindle 206.

When the spring 21 is in a first state (e.g., in an non-collapsed state or a minimally collapsed state), the knob 10 and the spindle 206 (FIG. 1B) rotate together as a unit due to a selectable engagement interface (e.g., based on engagement of tapered surfaces 44 and 54 shown in FIG. 2A). When the spring 21 is in a second state (e.g., more collapsed, as shown in FIG. 2C), the selectable engagement interface permits rotation of the knob 10 relative to the spindle 206.

The spring 21 may be toollessly collapsible without requiring any part of the knob assembly 100 (and/or any part of a sighting device assembly using the knob assembly 100) to be separated from the knob assembly 100 (and/or the sighting device assembly). In this embodiment, the knob assembly 100 includes a retaining cap 31 and a ring member 15 (such as a grippable lock ring or other toolless grippable device). In various embodiments, a washer (not shown) may be located between the spring 21 and a bottom surface of the retaining cap 31.

The retaining cap 31 includes a first threaded section 33 to mate with a threaded bore 16 of the ring member 15. The retaining cap 31 also includes a second section 32 (e.g., a threaded opening 32, shown in FIG. 1B) fixably attached to a threaded section of the collet 41.

Figure 2B:
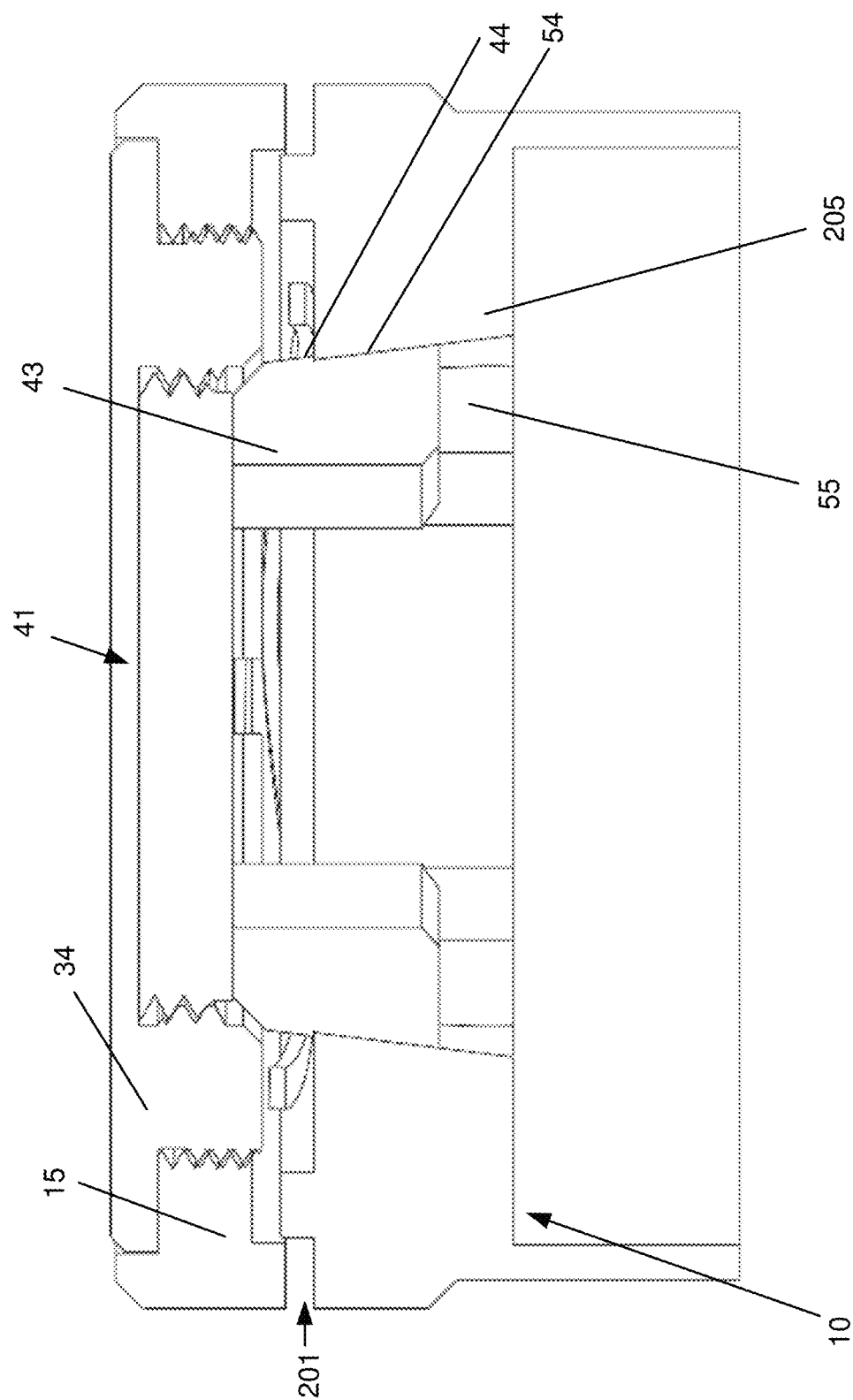
FIG. 2B illustrates a sectional view of the part of the optical device of FIG. 2A, in a second state in which an operator has backed out a ring member to provide a gap.
Figure 2C:
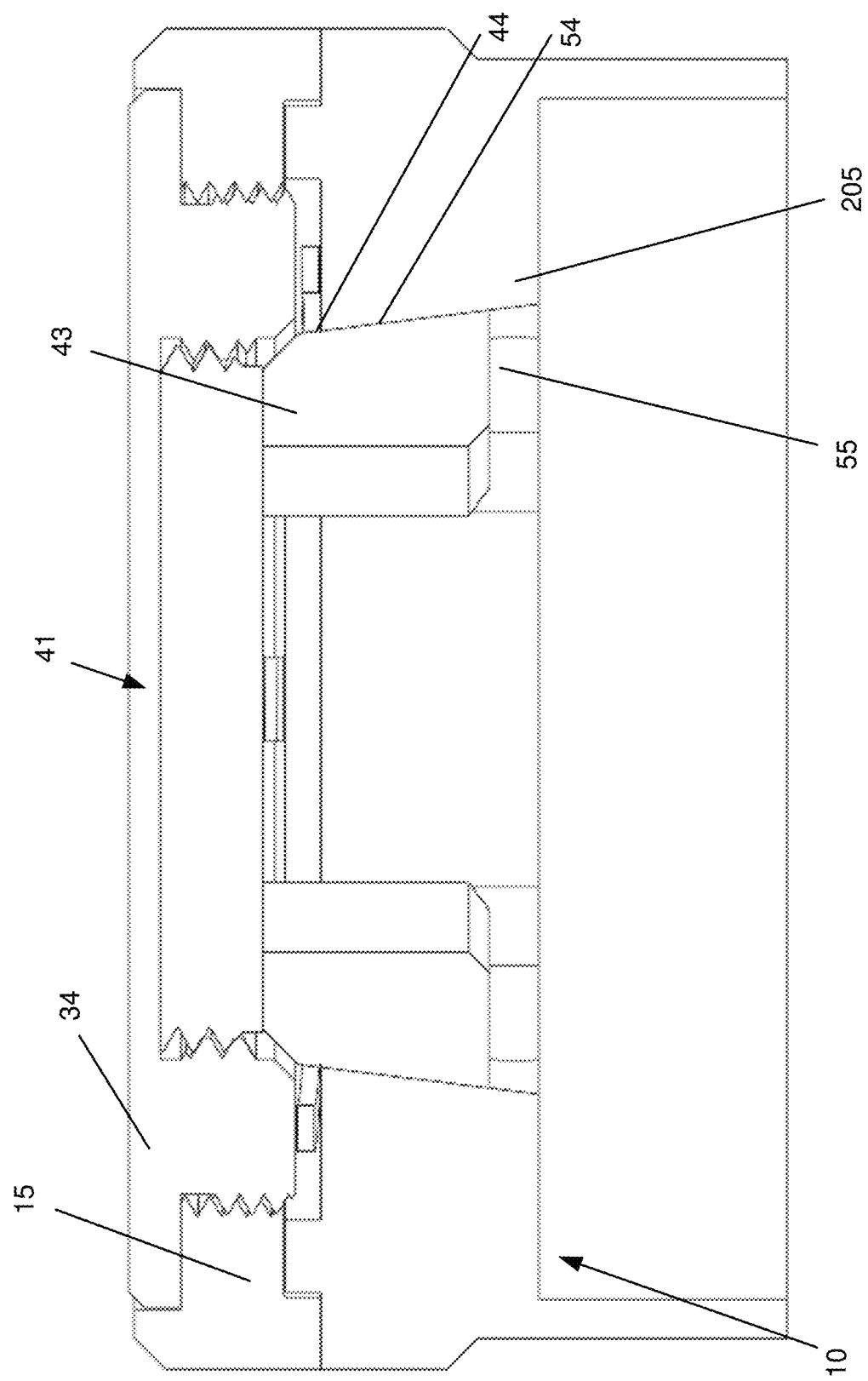
FIG. 2C illustrates a sectional view of the part of the optical device of FIG. 2A, in a third state in which the retaining cap is shown pushed down after the ring member has been backed out.

Referring now to FIG. 2A, for operation to set the knob 41 to the spindle 206 (FIG. 1B) without the use of a tool, the operator may back out the ring member 15 until it contacts a head 34 or other retainer of the retaining cap 31, providing the gap 201 shown in FIG. 2B. The operator may then press down on the retaining cap 31 to at least partially collapse the spring 21—the resulting state is illustrated in FIG. 2C.

In this state (shown in FIG. 2C), the collet 41 is disengaged from the spindle 206 (FIG. 1B). The tapered surface 44 of each capturing member 43 of the collet 41 is no longer urged, by the spring force, against the corresponding tapered surface 54 of the interior 205 of the knob 10. Thus, the knob 10 may be rotated relative to the spindle 206.

Rotation of the knob 10 relative to the spindle 206 (FIG. 1B) allows the operator to perform a calibration (e.g., to set the position of the knob 10 to a zero position, after having adjusted the optic to the desired aim setting). After setting to the zero positon, the operator may release the downward force applied to the retaining cap 31 (allowing the spring 21 to return to its non-collapsed or less collapsed state), re-engaging the collet 41 to the spindle 206, which allows the knob 10 and the spindle 206 to rotate together as a unit so that the operator may make adjust an optical or electronic element of the optical device.

In this embodiment, the collet 41 includes capturing members 43 received by slots 55 or other cavities defined by an interior 205 of the knob 10 and/or the spindle 206 (FIG. 1B). The capturing members 43 are movable within the slots 55, and the tapered surface 44 is defined by these capturing members 43. In other examples, it may be possible for the collet 41 to define a slot or other cavity to receive tapered surfaces of capturing members defined by a spindle assembly.

In this embodiment, the selectable engagement interface includes two tapered surfaces 44 and 54. In other embodiments, it may be possible and practical to use a single tapered surface to engage/disengage some other surface. In embodiments using a single tapered surface, it may be possible and practical to use an interior of the knob assembly, wedging members, or the spindle to define the tapered surface.

In this embodiment, the collet 41 has four capturing members. Other embodiments may have fewer capturing members (e.g., two) or more capturing members. Some embodiments may include a body and a single capturing member with an annular opening to receive the spindle. In these various embodiments, the capturing member(s) may at least partially surround or flank the spindle 206.

Referring again to FIG. 1A, the exterior threading of the collet 41 is discontinuous (e.g., has non-contiguous threaded sections). Accordingly, the collet 41 may have at least one truncated side (in this embodiment, the collet 41 has flat non-threaded opposite sides). The at least one truncated side may provide a space to receive a back end of the user-depressible button 11 (or some other button assembly component). This allows the button 11 to be horizontally aligned with at least part of the collet 41 (e.g., with the capturing members 44), which allows for a compact height of the knob assembly. One other embodiments, a collet may have only one truncated side (e.g., one flat side) instead of opposite truncated sides.

Figure 7:
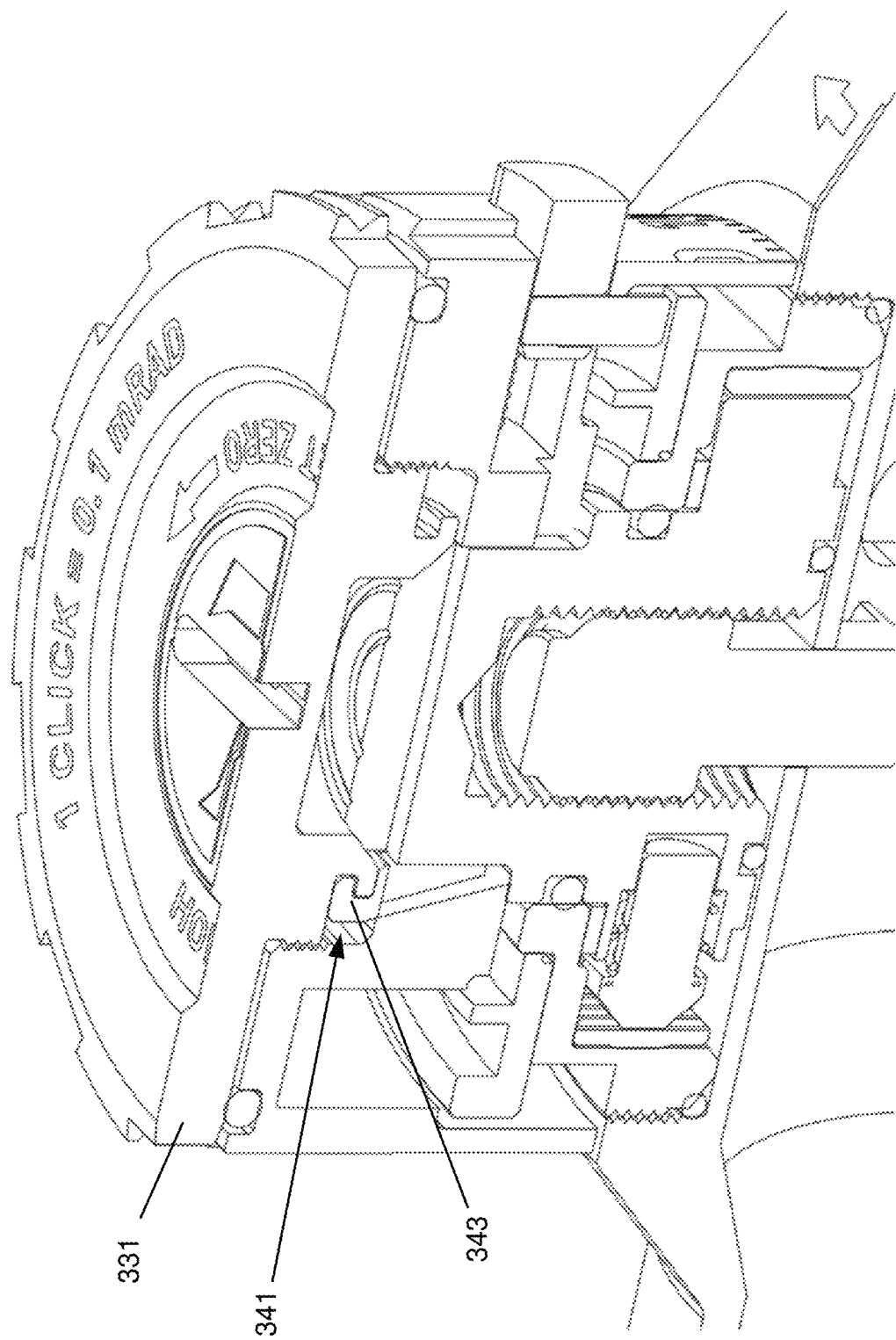
FIG. 7 illustrates an isometric section view of part of an optical device including the toolless knob assembly of FIG. 3A, in which the section view is taken along the length of the optical device.

Referring now to FIGS. 2A-C, in various embodiments, a turret assembly may include, with reference to FIGS. 3 and 7 of the '636 patent, the spindle 116 and the plunger 122. As further described in the '636 patent, rotation of a spindle 116 may be translated into linear motion of plunger 122 along an axis extending outwardly from a sighting device. This linear motion may adjust a position of an adjustable element, such as any optical or electrical element within a main tube of the sighting device.

Any sighting device assembly described herein may be mounted to a main tube of sighting device, which may contain at least one adjustable element, such as a reticle, lens assembly, or other optical or electrical elements, which may be movably mounted in a substantially perpendicular orientation relative to a longitudinal tube axis. The main tube and/or sighting device may be similar to any main tube and/or sighting device now known (such as those described in the '636 patent), or later developed.

The knob assembly 100 may be similar in any respect to any rotatable knob assembly described in the '636 patent. In particular, knob 10 may be supplied with a fine scale (not shown) composed of parallel longitudinal indicia spaced apart around the circumference of dial to facilitate fine adjustments. These may be similar to any indicia shown or described in the '636 patent. Also, the knob assembly 100 may include a depressible button 11, which may be similar in any respect to any depressible button 11 described in the '636 patent.

The term spring device, as used herein, includes any object to generate a spring force. This may be a wave spring, which may be made of metal or some other material. In other embodiments, the spring device may be a rubber or plastic material that may store energy when compressed.

The illustrated embodiments show a knob as the user interface to adjust the optical device. However, other embodiments may use any other first rotatable part as the user interface. Similarly, the illustrated embodiments show a spindle rotatable using the knob. Other embodiments may use any other second rotatable part that is rotatable using the first rotatable part.

In the illustrated embodiment, the body of the collet 41 has a threaded exterior to threadingly couple to the second section 32 of the retaining cap 31. In another embodiment, a body of a collet may instead define a threaded bore to threadably couple to a protrusion (which may have threading) defining a bottom end of the retaining cap 31.

Also, any threaded section of a collet may be fixably coupled to a threaded section of a retaining cap 31 using a thread locking compound, such as Loctite® or some other adhesive (not shown). In other embodiments, a collet may have any threaded or non-threaded attachment interface, now known or later developed, for coupling (e.g., fixably) a collet to a retaining cap or other user interface.

Figure 3A:
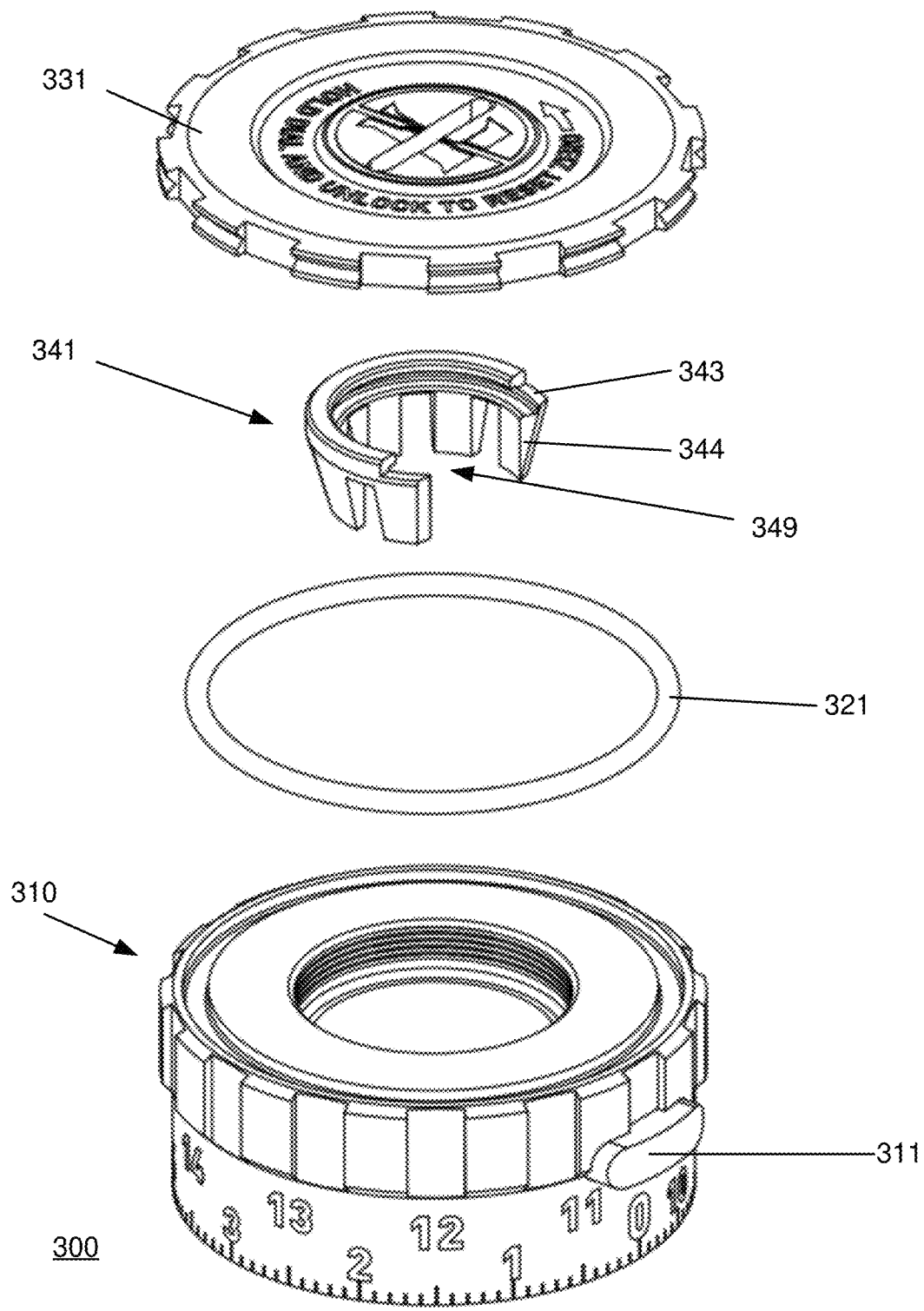
FIG. 3A illustrates an exploded isometric view of another toolless knob assembly, according to various embodiments.
Figure 4:
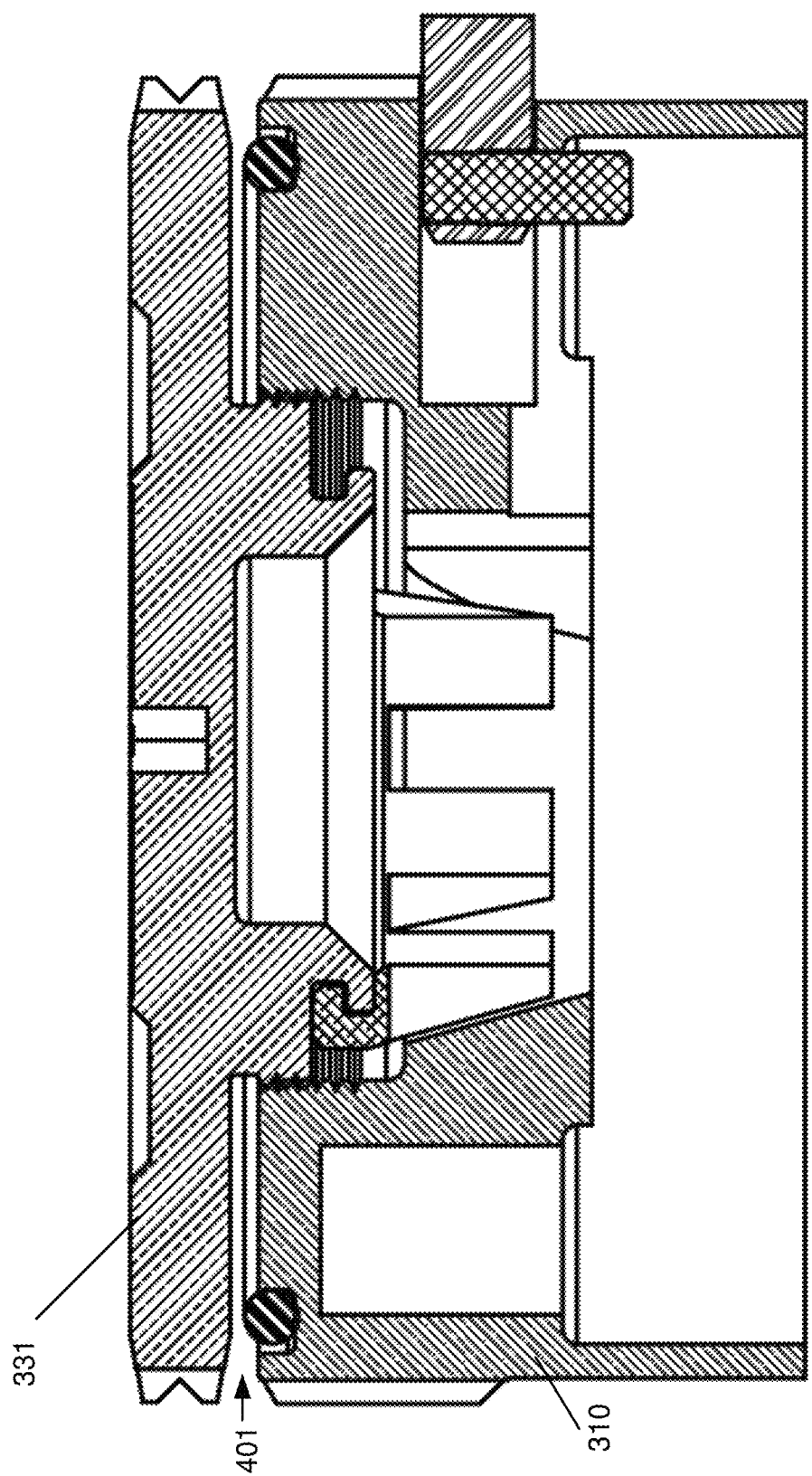
FIG. 4 illustrates a sectional view of part of an optical device including the toolless knob assembly of FIG. 3A, in a first state in which an operator has backed out a retaining cap to provide a gap.
Figure 5:
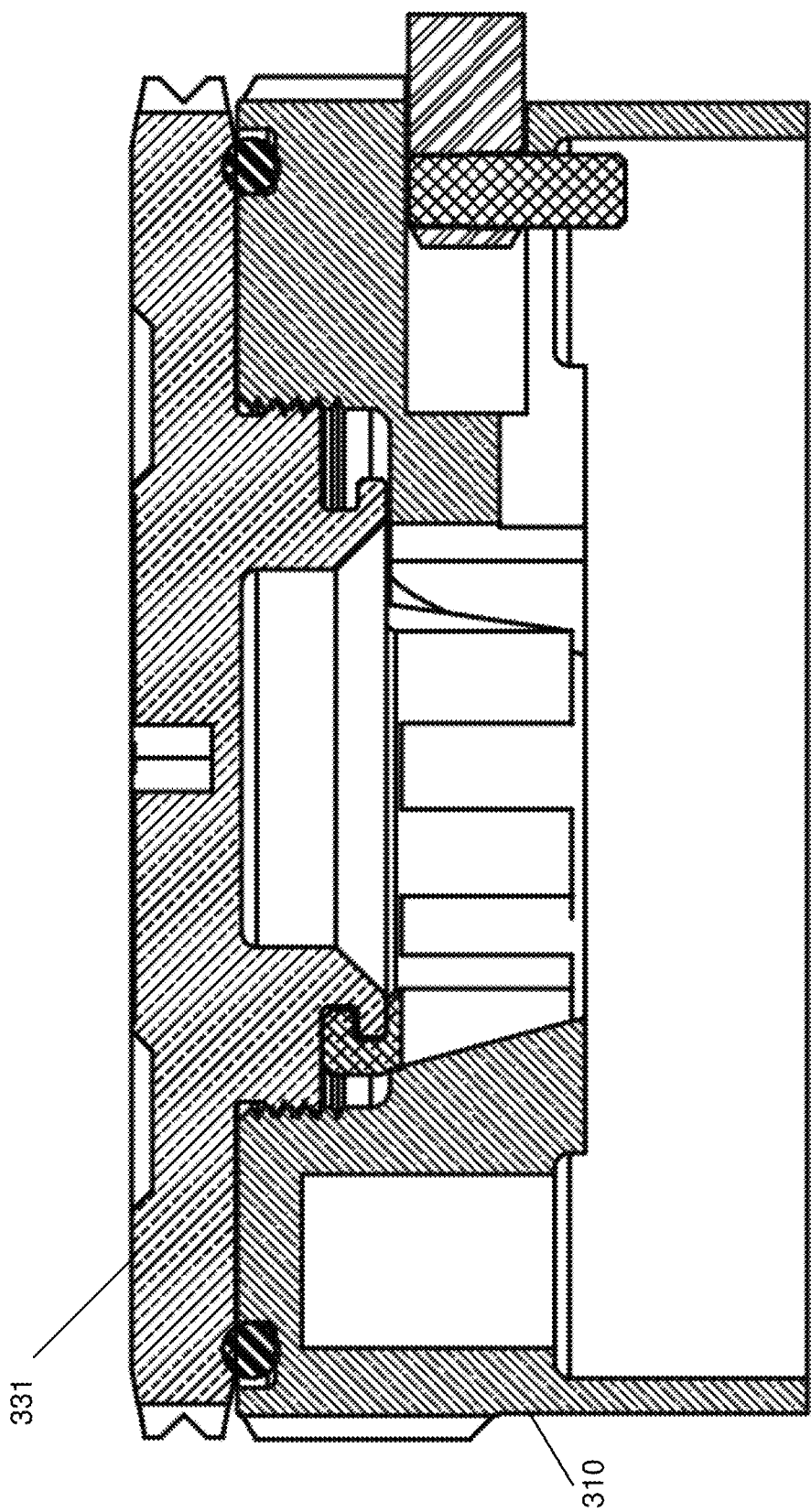
FIG. 5 illustrates a sectional view of the part of the optical device of FIG. 4, in a second state in which the retaining cap is shown threaded down after being backed out.

FIG. 3A illustrates an exploded isometric view of another toolless knob assembly 300, according to various embodiments. FIG. 3B illustrates a sectional view of part of a turret assembly including the toolless knob assembly 300 of FIG. 3A. FIG. 4 illustrates a sectional view of part of a turret assembly including the toolless knob assembly 300 of FIG. 3A, in which an operator has backed out a retaining cap 331 to provide a gap 401. FIG. 5 illustrates a sectional view of the part of the turret assembly of FIG. 4, in which the retaining cap 331 is shown threaded down after being backed out.

The knob 310 may be similar in any respect to any knob described herein. A top of the knob 310 may define a pocket to receive a sealing ring 351 (FIG. 3B). Also, a protective device 321 such as a washer or a seal may be provided between a planar top surface of the knob 310 and a bottom of the retaining cap 331, as illustrated in FIG. 3B.

Referring again to FIG. 3A, in this embodiment the capturing members 344 of collet 341 have a taper that is inverted with respect to the taper of the capturing members 44 (FIG. 1A). That is, the capturing members narrow in a downward direction, instead of widening as in the embodiment of FIG. 1A. The body 343 of the collet 341 defines a non-threaded attachment interface (e.g., a snap-fit interface) to couple to the retaining cap 331.

Whereas the collet 41 (FIG. 1A) has an elongated shape with truncated opposite sides, the body 343 has an open ring shape. In particular, the body 343 has a ring segment and an opening 344. The opening 349 is defined by the body 343 as well as a discontinuity in the capturing members 344 (e.g., the capturing members 344 may only partially surround a spindle).

Figure 6A:
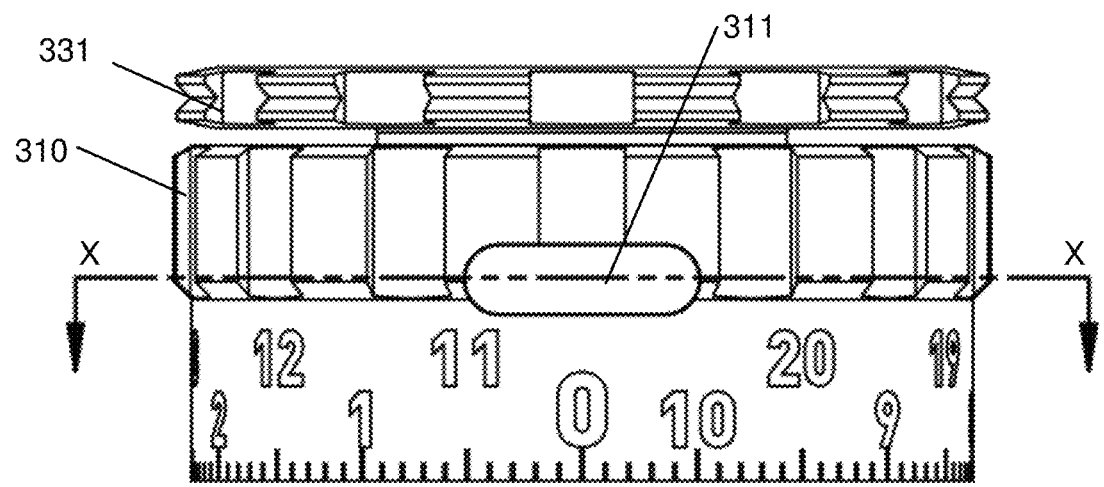
FIG. 6A illustrates a front view of the toolless knob assembly of FIG. 3A.
Figure 6B:
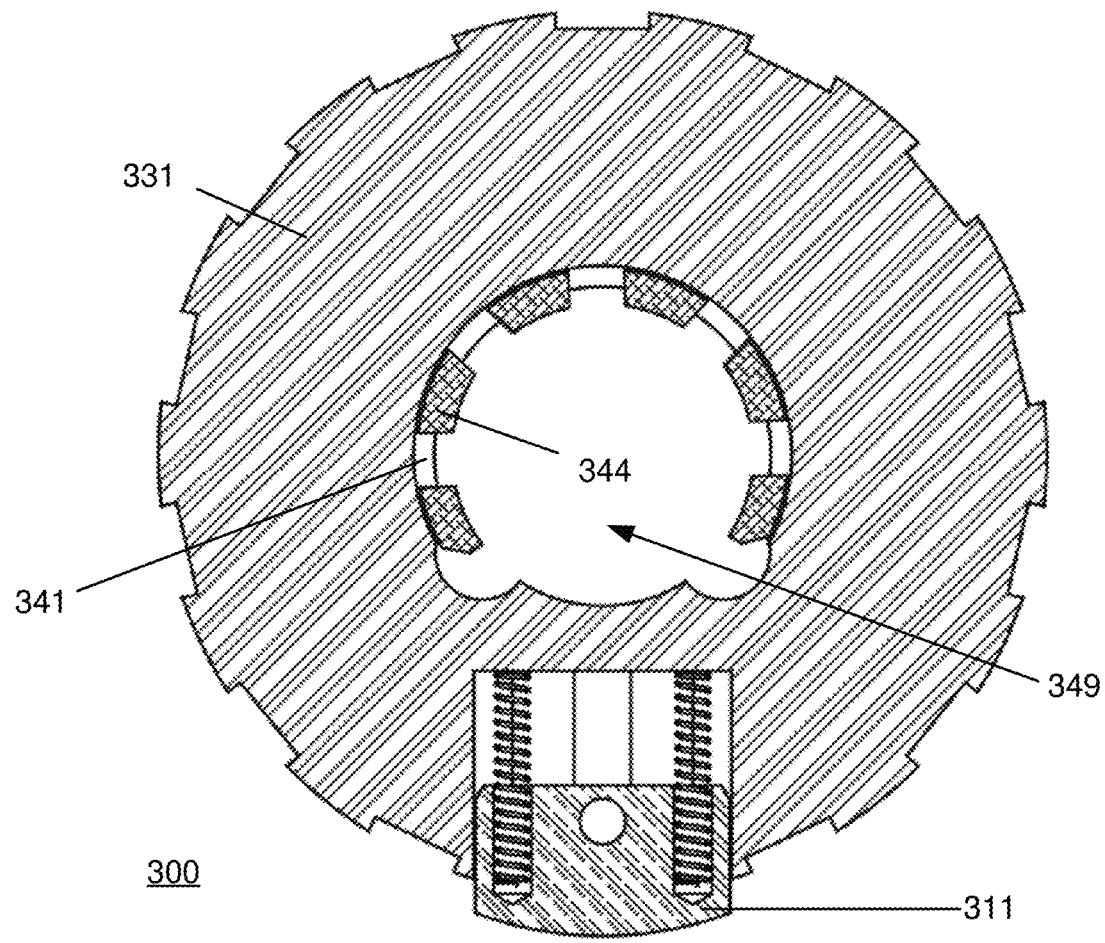
FIG. 6B illustrates a section view of the toolless knob assembly of FIG. 3A taken along section line X-X of FIG. 6A.

The button 311 may be similar in any respect to the button 11 (FIG. 1A). The collet 341 may be rotationally timed, as illustrated by way of FIGS. 6A and 6B, so that a radial center line of this opening 349 is coincident with a center axis of the button 311 (e.g., a line extending from the center of the contact surface of the button to a center of a back end of the bottom). Accordingly, like the embodiment of FIG. 1A, a space is provided for the button 311 to move into when depressed.

Referring now to FIG. 4, to rotate the knob 310 relative to a spindle an operator may back out the retaining cap 331 (e.g., from a threaded opening defined by the knob 310). This is in contrast to FIG. 1A where the ring member 15 is backed out (as can be seen in the exploded view, the FIG. 3A embodiment has no separate ring member). This provides the gap 401 between the retaining cap 331 and the knob 310.

In this state the capturing members 343 of the collet 341 have ridden up the tapered cavity they are located in. This can be seen by comparing FIGS. 4 and 5. As can been seen in FIG. 4 specifically, this moves the capturing members 43 into a wider part of the tapered cavities, disengaging the collet 341 from the spindle. In this state, the knob 310 may be rotated relative to the spindle.

Also, an operator does not apply the downward force in this state because this embodiment does not utilize the wave ring utilized in the embodiment in FIG. 1A, as illustrated in the exploded view. This may have the advantage that it requires less coordination by the operator. However, the embodiment of FIG. 1A may provide the advantage that a more deliberate action is required to rotate the knob 10 relative to the spindle 206.

Referring now to FIG. 5, when the operator wishes to re-engage the knob 341 to the spindle, instead of pushing down on a capturing device as in the embodiment of FIG. 1A, the operator may thread the retaining cap 431 back down. This moves the capturing members 43 into a narrower part of the tapered cavities, engaging the collet 341 to the spindle, as illustrated in FIG. 5. In this state, the knob 341 and the spindle rotate together as a unit.

Figure 8A:
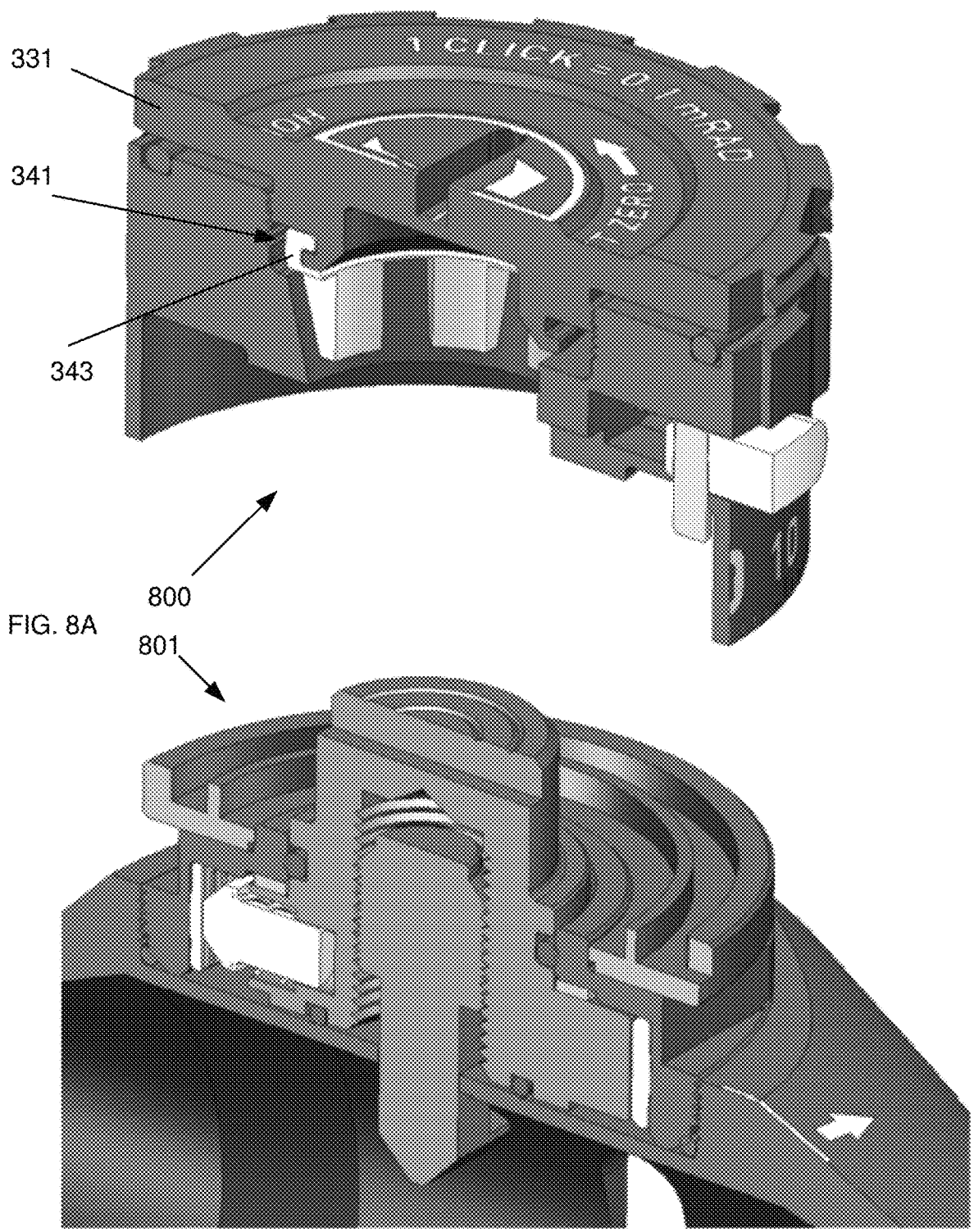
FIG. 8A is a partially exploded view of the isometric section view of FIG. 7, in which a grippable part assembly of a turret assembly is separated from a spindle assembly of the turret assembly.
Figure 8B:
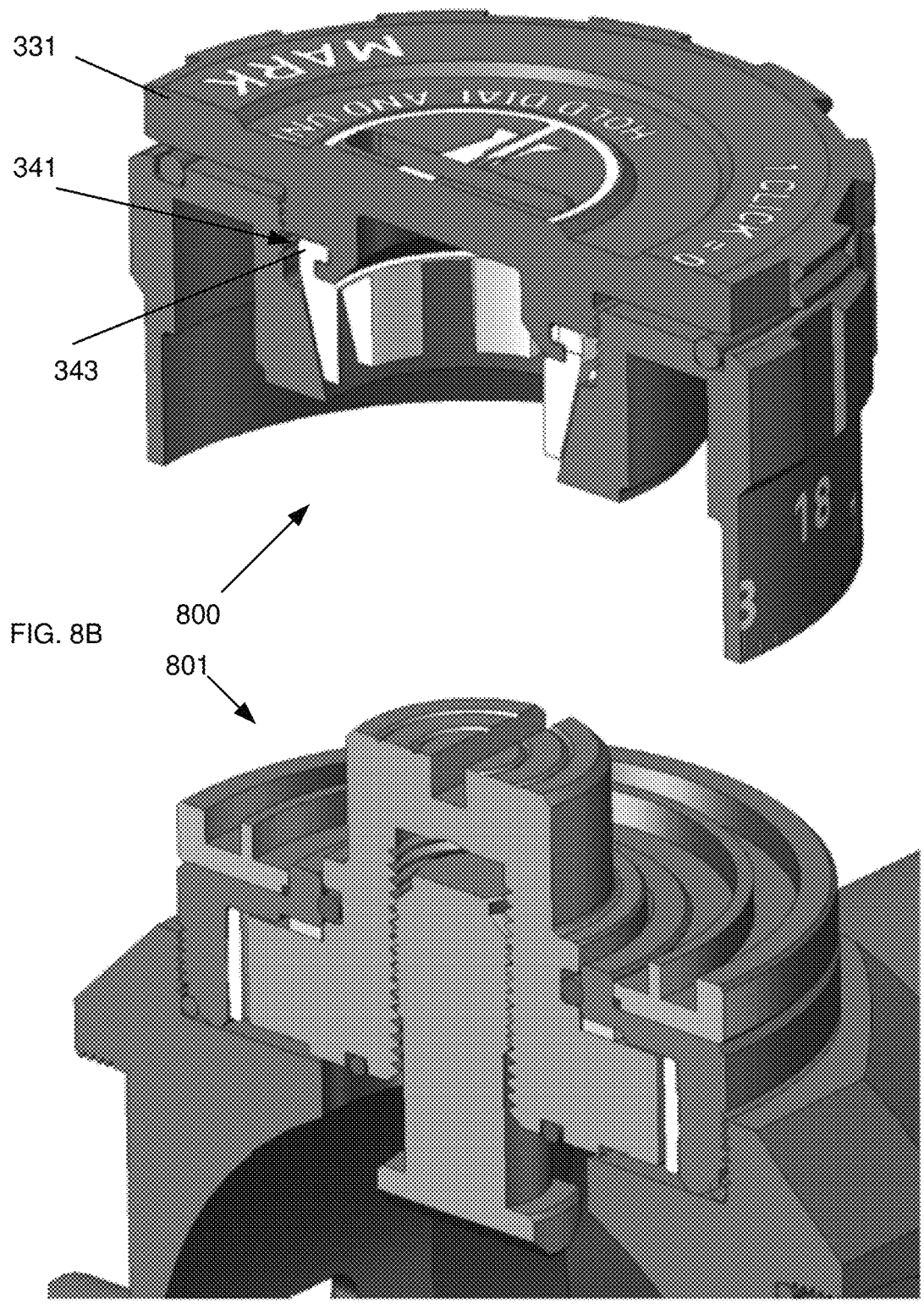
FIG. 8B is a partially exploded isometric section view of the part of the optical device of FIG. 7, in which a grippable assembly of a turret assembly is separated from a spindle assembly of the turret assembly, and in which the section view is taken along a width of the optical device.

A non-threaded attachment interface (e.g., a snap-fit interface) defined by the body 343 of the collet 341 is depicted in FIGS. 7, 8A, and 8B. In this snap-fit interface, the body 343 fits around a lower section of the retaining cap 331. The body defines channel in the shape of a circular segment, which fits onto a rim of the lower section of the retaining cap 331 (the rim also has a shape of a circular segment). In another embodiment, it may be possible to reverse the rim and the channel (so that the rim is defined by a collet body). In various embodiments, any other threaded or non-threaded attachment interface may be used to couple the a collet to the grippable part (e.g., the retaining cap).

FIG. 8A and FIG. 8B illustrate a turret assembly in which a grippable assembly 800 (e.g., a knob assembly) is separated from the spindle assembly 801. FIG. 8A is a section view taken along a length of the illustrated part of the optical device (e.g., a riflescope), while FIG. 8B is a section view taken along the width of the illustrated part of the optical device (the width being perpendicular to the length).

Various separate parts described herein may be integrally formed into a single part in other embodiments. As just one example with reference to FIG. 3A, in some embodiments it may be possible to provide an integrally formed part having a top section corresponding to the retaining cap 331 and a bottom section corresponding to the collet 341 (such an embodiment may utilize a split ring member). Also, in other embodiments, various single parts described herein may be an assembly of more than one part fixably coupled together.

EXAMPLES

The illustrated embodiments describe some examples within the scope of the disclosure of the present application. However, other embodiments within the scope of this disclosure may include any one of the following examples.

Example 1 is a rotatable assembly including a rotatable knob or other first rotatable part, the rotatable assembly further including: a collet or other body having one or more capturing members to at least partially surround or flank a spindle or other second rotatable part; and a retaining cap or other grippable device usable to move the collet or other body relative to the spindle or other second rotatable part to disengage the one or more capturing members from the spindle or other second rotatable part; wherein the knob or other first rotatable part and the spindle or other second rotatable part rotate together as a unit when the one or more capturing members are engaged to the spindle or other second rotatable part, and wherein the knob or other first rotatable part rotates relative to the spindle or other second rotatable part when the one or more capturing members are disengaged from the spindle or other second rotatable part.

Example 2 includes the subject matter of example 1 (or any other example herein), wherein the one or more capturing members are located in one or more tapered cavities, and wherein: the collet or other body is engaged to the spindle when the one or more capturing members are located in a first section of the one or more tapered cavities; and the collet or other body is not engaged to the spindle when the one or more capturing members are located in second wider section of the one or more tapered cavities.

Example 3 includes the subject matter of any examples 1-2 (or any other example herein), wherein the one or more capturing members include: a section to engage with a corresponding part of spindle or other second rotatable part; and a tapered surface to contact an interior of the rotatable knob or other first rotatable part.

Example 4 includes the subject matter of any examples 1-3 (or any other example herein), wherein an outer surface of the one or more capturing members comprises a tapered surface.

Example 5 includes the subject matter of any examples 1-4 (or any other example herein), further comprising a spring device or other biasing element to urge the collet or other body away from the spindle or other second rotatable part to engage the one or more capturing members to the spindle or other second rotatable part.

Example 6 includes the subject matter of any examples 1-5 (or any other example herein), wherein movement of the collet or other body towards the spindle or other second rotatable part disengages the one or more capturing members from the spindle or other second rotatable part.

Example 7 includes the subject matter of any examples 1-6 (or any other example herein), further comprising a wave spring to urge the collet or other body away from the spindle or other second rotatable part.

Example 8 includes the subject matter of any examples 1-5 (or any other example herein), wherein movement of the collet or other body away from the spindle or other second rotatable part disengages the one or more capturing members from the spindle or other second rotatable part.

Example 9 includes the subject matter of any examples 1-8 (or any other example herein), the collet or other body includes a section having a ring segment and an opening.

Example 10 includes the subject matter of any examples 1-9 (or any other example herein), wherein the one or more capturing members comprise a plurality of capturing members.

Example 11 includes the subject matter of any examples 1-10 (or any other example herein), wherein the retaining cap assembly includes a retaining cap threadingly coupled to the grippable device, the retaining cap including: a head; a threaded section to mate with a threaded bore of the retaining cap or other grippable device; and an additional section coupled to the collet or other body.

Example 12 includes the subject matter of any examples 1-11 (or any other example herein), wherein the additional section is threadingly coupled to a threaded bore of the collet or other body.

Example 13 is a sighting device including the subject matter of any of claims 1-12 (or any other example herein), wherein the rotatable assembly is part of a turret assembly of the sighting device.

Example 14 includes the subject matter of any of examples 1-13 (or any other example here), wherein the spindle or other second rotatable part is configured to actuate an optical or electrical element located in a main tube of a riflescope, a telescope, or other aimed optical device, when the spindle or other second rotatable part is rotated together with the knob or other first rotatable part.

Example 15 is an optical device including an optical or electronic element adjustable based on a rotational position of a spindle, the optical device comprising: a rotatable assembly including a rotatable knob, the rotatable assembly further including: a collet having one or more capturing members to at least partially surround or flank the spindle; wherein the optical device further comprises: a grippable device usable to move the collet toward or away from the spindle to disengage the one or more capturing members from the spindle; wherein the knob and the spindle rotate together as a unit when the one or more capturing members are engaged to the spindle, and wherein the knob rotates relative to the spindle when the one or more capturing members are disengaged from the spindle.

Example 16 includes the subject matter of example 15 (or any other example herein), wherein the one or more capturing members comprise one or more tapered members; wherein the collet further includes a body having the one or more tapered members extending therefrom.

Example 17 includes the subject matter of any of examples 15-16 (or any other example herein), wherein the one or more tapered members widen in a direction away from the body.

Example 18 includes the subject matter of any of examples 15-17 (or any other example herein), wherein the one or more tapered members narrow in a direction away from the body.

Example 19 includes the subject matter of any of examples 15-18 (or any other example herein), wherein the one or more tapered members are integrally formed on the body.

Example 20 includes the subject matter of any of examples 15-19 (or any other example herein), wherein: the body has an open ring shape, or the body comprises an elongated body having a depth, a width, and a length that is greater than the width.

It will be obvious to those having skill in the art that many changes may be made to the details of the above-described embodiments without departing from the underlying principles of the invention. The scope of the present invention should, therefore, be determined only by the following claims.

The invention claimed is:

1. An apparatus, comprising:
   a rotatable assembly including a rotatable knob or another first rotatable part, the rotatable assembly further including:
      a collet or another body having one or more capturing members to at least partially surround or flank a spindle or another second rotatable part; and
      a retaining cap or another grippable part usable to move the collet or the other body relative to the spindle or the other second rotatable part to disengage the one or more capturing members from the spindle or the other second rotatable part;
   the rotatable assembly configured to bias the collet or the other body in a direction away from the spindle or the other second rotatable part;
   wherein the knob or the other first rotatable part and the spindle or the other second rotatable part rotate together as a unit when the one or more capturing members are engaged to the spindle or the other second rotatable part, and
   wherein the knob or the other first rotatable part rotates relative to the spindle or the other second rotatable part when the one or more capturing members are disengaged from the spindle or the other second rotatable part.

2. The apparatus of claim 1, wherein the one or more capturing members are located in one or more tapered cavities, and wherein:
   the collet or the other body is engaged to the spindle when the one or more capturing members are located in a first section of the one or more tapered cavities; and
   the collet or the other body is not engaged to the spindle when the one or more capturing members are located in second wider section of the one or more tapered cavities.

3. The apparatus of claim 1, wherein the one or more capturing members include:
   a section to engage with a corresponding part of spindle or the other second rotatable part; and
   a tapered surface to contact an interior of the rotatable knob or the other first rotatable part.

4. The apparatus of claim 1, wherein an outer surface of the one or more capturing members comprises a tapered surface.

5. The apparatus of claim 1, wherein the collet or the other body is biased using a spring part, the spring part to urge the collet or the other body away from the spindle or the other second rotatable part to engage the one or more capturing members to the spindle or the other second rotatable part.

6. The apparatus of claim 1, wherein movement of the collet or the other body towards the spindle or the other second rotatable part disengages the one or more capturing members from the spindle or the other second rotatable part.

7. The apparatus of claim 1, wherein the collet or the other body is biased using.

8. The apparatus of claim 1, the collet or the other body includes a section having a ring segment and an opening.

9. The apparatus of claim 1, wherein the one or more capturing members comprise a plurality of capturing members.

10. An apparatus, comprising:
    a rotatable assembly including a rotatable knob or another first rotatable part, the rotatable assembly further including:
       a collet or another body having one or more capturing members to at least partially surround or flank a spindle or another second rotatable part; and
       a retaining cap or another grippable part usable to move the collet or the other body relative to the spindle or the other second rotatable part to disengage the one or more capturing members from the spindle or the other second rotatable part; and
    wherein the knob or the other first rotatable part and the spindle or the other second rotatable part rotate together as a unit when the one or more capturing members are engaged to the spindle or the other second rotatable part, and
    wherein the knob or the other first rotatable part rotates relative to the spindle or the other second rotatable part when the one or more capturing members are disengaged from the spindle or the other second rotatable part;
    the retaining cap or the other grippable part being rotatable and including:
       a threaded section to mate with a threaded bore of the rotatable assembly; and
       an additional section coupled to the collet or the other body.

11. The apparatus of claim 10, wherein the additional section is threadingly coupled to a threaded bore of the collet or the other body.

12. The apparatus of claim 10, wherein movement of the collet or the other body away from the spindle or the other second rotatable part disengages the one or more capturing members from the spindle or the other second rotatable part.

13. The apparatus of claim 10, wherein the spindle or the other second rotatable part is configured to actuate an optical or electrical element located in a main tube of a riflescope, a telescope, or another aimed optical device, when the spindle or the other second rotatable part is rotated together with the knob or the other first rotatable part.

14. An optical device including an optical or electronic element adjustable based on a rotational position of a spindle, the optical device comprising:

a rotatable assembly including a rotatable knob, the rotatable assembly further including:
  a body having one or more capturing members to at least partially surround or flank the spindle;
wherein the optical device further comprises:
a grippable part usable to move the body toward or away from the spindle to disengage the one or more capturing members from the spindle;
wherein the knob and the spindle rotate together as a unit when the one or more capturing members are engaged to the spindle, and wherein the knob rotates relative to the spindle when the one or more capturing members are disengaged from the spindle;
wherein:
  1) the one or more capturing members comprise one or more tapered members, wherein the one or more tapered members widen a direction away from the body, or
  2) the rotatable assembly is configured to bias the body in a direction away from the spindle.

15. The optical device of claim 14, further comprising a retaining cap or another grippable part usable to move the body relative to the spindle to disengage the one or more capturing members from the spindle.

16. The optical device of claim 15, the retaining cap or the other grippable part including a threaded section to mate with a threaded bore of the rotatable assembly.

17. The optical device of claim 14, wherein the rotatable assembly is configured to bias the body in the direction away from the spindle; and
  wherein the one or more capturing members comprise one or more tapered members that narrow in a direction away from the body.

18. The optical device of claim 14, wherein the one or more tapered members are integrally formed on the body.

19. The optical device of claim 14, wherein:
  the body has an open ring shape, or
  the body comprises an elongated body having a depth, a width, and a length that is greater than the width.

20. The optical device of claim 16, the retaining cap or the other grippable part including an additional section coupled to the body.

* * * * *